(12) United States Patent
Howard (10) Patent No.: US 7,285,299 B1
(45) Date of Patent: *Oct. 23, 2007

(54) SURFACE PASTEURIZATION OF COOKED FOOD PRODUCTS

(76) Inventor: David Howard, 2403 E. 25 Pl., Tulsa, OK (US) 74114-3215

(*) Notice: Subject to any disclaimer, the term of this patent is extended or adjusted under 35 U.S.C. 154(b) by 691 days.

This patent is subject to a terminal disclaimer.

(21) Appl. No.: 10/369,318

(22) Filed: Feb. 18, 2003

Related U.S. Application Data (60) Provisional application No. 60/358,981, filed on Feb. 22, 2002.

(51) Int. Cl.
*A23B 4/005* (2006.01)

(52) U.S. Cl. .................. 426/129; 426/399; 426/401; 426/407; 426/412; 426/521; 426/524

(58) Field of Classification Search .............. 426/106, 426/129, 234, 240–243, 248, 645, 399, 401, 426/407, 412, 521, 524
See application file for complete search history.

(56) References Cited

U.S. PATENT DOCUMENTS

| | | | |
|---|---|---|---|
| 1,668,767 A | 5/1928 | Hanson et al. | |
| 1,907,649 A | 5/1933 | Marx | |
| 2,222,067 A | 11/1940 | Chaney et al. | |
| 2,364,049 A | 12/1944 | Bensel | |
| 2,442,070 A | 5/1948 | Bouchard | |
| 2,579,738 A | 12/1951 | Hargreaves | |
| 2,774,460 A | 12/1956 | Spoonhour | |
| 2,779,681 A | 1/1957 | Sell et al. | |
| 2,826,073 A | 3/1958 | Huyck et al. | |
| 3,258,109 A | 6/1966 | Breitenstein et al. | |
| 3,268,055 A | 8/1966 | Stein et al. | |
| 3,296,812 A | 1/1967 | Cloudy | |
| 3,597,228 A | 8/1971 | Jeppson et al. | |
| 3,898,854 A * | 8/1975 | McSheehy et al. | ............ 62/62 |
| 3,906,115 A | 9/1975 | Jeppson | |
| 3,961,090 A | 6/1976 | Weiner et al. | |
| 3,966,980 A | 6/1976 | McGuckian | |
| 3,999,946 A | 12/1976 | Patel et al. | |
| 4,091,921 A | 5/1978 | Lewis | |
| 4,179,397 A | 12/1979 | Rohowetz et al. | |
| 4,188,437 A | 2/1980 | Rohowetz | |
| 4,233,323 A * | 11/1980 | Sway et al. | ................... 426/55 |

(Continued)

OTHER PUBLICATIONS

Journal of Food Science (1994), 59 (1) 1-5.

(Continued)

*Primary Examiner*—Drew Becker
(74) *Attorney, Agent, or Firm*—Fellers, Snider, Blankenship, Bailey & Tippens, P.C.; Dennis D. Brown (57) ABSTRACT

A method of surface pasteurizing precooked food products which are contained in packages. The method preferably comprises the steps of continuously heating the packages of the precooked food product such that the outer surfaces of the products contained within the packages are taken to an effective pasteurization temperature and then continuously cooling the packages of product. The heating and cooling steps are preferably conducted in a manner such that no more than a 10° temperature increase and preferably substantially no temperature increase occurs in the internal core of the product as a result of the heating step.

12 Claims, 7 Drawing Sheets

U.S. PATENT DOCUMENTS

| | | | |
|---|---|---|---|
| 4,345,682 | A | 8/1982 | White et al. |
| 4,391,862 | A | 7/1983 | Bornstein et al. |
| 4,448,792 | A | 5/1984 | Schirmer |
| 4,554,437 | A | 11/1985 | Wagner et al. |
| 4,696,580 | A | 9/1987 | Kameda |
| H762 | H | 4/1990 | DeMasi et al. |
| 4,948,610 | A | 8/1990 | Goglio |
| 4,968,520 | A * | 11/1990 | Wang .......................... 426/524 |
| 5,034,235 | A * | 7/1991 | Dunn et al. .................. 426/238 |
| 5,186,310 | A | 2/1993 | Winchester |
| 5,205,135 | A | 4/1993 | Lang |
| 5,269,216 | A | 12/1993 | Corominas |
| 5,281,426 | A * | 1/1994 | Pardo .......................... 426/232 |
| 5,298,270 | A | 3/1994 | Morgan |
| 5,352,472 | A | 10/1994 | Lucke |
| 5,356,649 | A | 10/1994 | LaMotta et al. |
| 5,366,063 | A | 11/1994 | Pollock |
| 5,366,746 | A | 11/1994 | Mendenhall |
| 5,374,437 | A | 12/1994 | Corominas |
| 5,466,498 | A | 11/1995 | Forloni et al. |
| 5,470,597 | A | 11/1995 | Mendenhall |
| 5,512,312 | A | 4/1996 | Forney et al. |
| 5,520,013 | A | 5/1996 | Kuo |
| 5,533,343 | A | 7/1996 | Moshier et al. |
| 5,537,916 | A * | 7/1996 | Lagares-Corominas ...... 99/356 |
| 5,707,672 | A | 1/1998 | Taguchi et al. |
| 5,741,536 | A | 4/1998 | Mauer et al. |
| 5,780,098 | A | 7/1998 | Battles |
| 5,809,787 | A | 9/1998 | Zittel |
| 5,896,872 | A * | 4/1999 | Sridharan ................... 134/25.3 |
| 5,916,617 | A * | 6/1999 | Polster ....................... 426/521 |
| 5,952,027 | A | 9/1999 | Singh |
| 5,966,962 | A | 10/1999 | Murray et al. |
| 6,009,719 | A | 1/2000 | Ochs |
| 6,073,540 | A | 6/2000 | Garrett |
| 6,080,437 | A | 6/2000 | Mauer et al. |
| 6,132,784 | A * | 10/2000 | Brandt et al. ............... 426/248 |
| 6,148,618 | A | 11/2000 | Malmberg et al. |
| 6,167,708 | B1 | 1/2001 | Cloarec |
| 6,291,003 | B1 * | 9/2001 | Riemann et al. ............ 426/511 |
| 6,537,494 | B2 * | 3/2003 | Garlick ........................ 422/27 |
| 6,622,513 | B1 | 9/2003 | Howard |
| 6,675,589 | B1 | 1/2004 | Howard |
| 6,767,569 | B1 * | 7/2004 | Marsden et al. ............ 426/326 |
| 6,780,448 | B1 * | 8/2004 | Howard ...................... 426/241 |
| 6,867,392 | B1 | 3/2005 | Howard |
| 6,964,787 | B2 * | 11/2005 | Swart et al. ................. 426/234 |
| 6,964,788 | B2 * | 11/2005 | Phebus et al. .............. 426/335 |
| 7,069,840 | B1 | 7/2006 | Howard |
| 7,108,882 | B2 * | 9/2006 | Schaefer et al. ............ 426/509 |
| 2003/0072674 | A1 | 4/2003 | Melker et al. |

OTHER PUBLICATIONS

Description of the Unitherm browning system, date n.a.
Summary Judgement Order by U.S. District Court for the Western District of Oklahoma, Case No. CIV-01-347-C; Unitherm Food Systems, Inc. et al. v. Swift-Eckrich, Inc., d/b/a ConAgra Refrigerated Foods.
Smoking & Browning Under 10 minutes—Unitherm advertisement, date n.a.
Unitherm Bulletin—"Browning in Traditional Continuous Ovens", date n.a.
"Infra-Red Radiation for Food Processing II. Calculation of Heat Penetration During Infra-Red Frying of Meat Products," Magnus dagerskog, , Lebensm.-Wiss u. Technol., 12, 252-257 (1979).
Heat Transfer and Food Products; Bengt Hallstron, et al., pp. 214-231, Elsevier Applied Science Publishers Ltd. 1988.
Studies on the Application of Infrared in Food Processing, Asselbergs, et al. presented at the 20th annual meeting, Institute of Food Technologists, May 17, 1960.
"Infrared Radiative Drying in Food Engineering : A Process Analysis," Constantine Sandu, Biotechnology Progress, (vol. 2, No. 3) Sep. 1986.
"The A.G.S. Food System Chilled Pasteurized Food", col. McGuckian, May 1969.
"The microbiological shelf life of vacuum packed broiled chickens," Mulder, et al., Speiderholt Institute for poultry research, the Netherlends, May 1974.
Microbiological Stability of Pasteurized Ham Subjected to a Secondary Treatment in Retort Pouches, Delaquis, et al., Journal of Food Protection, vol. 49, No. 1, pp. 42-46, Jan. 1986.
"Food preservation by combined methods," L. Leister, Food Research International 25, 1992, pp. 151-158.
"Reduction of Listeria monocytogenes in Precooked Vacuum-Package Beef Using Postpackaging Pasteurization," D. Kay Cooksey, et al., Journal of Food Protection, vol. 56, Dec. 1993, pp. 1034-1038.
"Survival of Listeria monocytogenes in Postpasteurized Precooked Beef Roasts," Margaret D. Hardin, et al., Journal of Food Protection, vol. 56, No. 8, pp. 655-660 (Aug. 1993).
"Food Preservation by Hurdle-Technology," L. Leister, et al., pp. 511-520, Proceedings of the 1993 Food Preservation 2000 Conference, Oct. 19-21, 1993, Natick, Massachusetts.
"Food preservation by hurdle technology," Lothar Leister, et al., Trends in Food Science & Technology, Feb. 1995 (vol. 6), pp. 41-46.
"Extending the Shelf-Life of Chilled Ready Meals," Robert Shaw, Meat Quality and Meat Packaging, Jun. 23, 1998.
"New Methods of Food Preservation," edited by G. W. Gould, published 1995, Chapman & Hall.
"Reducing Process Variation in the Cooking and Smoking Process," Robert E. Hanson, 50th Annual Reciprocal Meat Conference, vol. 50, 1997.
"Radiant Wall Oven Applications," © 1996, Pyramid Manufacturing.
"Shelf Life Extension and Pathogen Reduction of Fresh Chicken Through Surface Pasteurization Using Radian Heat and Anti-Microbial Agents," MD. Mahbubul Islam, for B. Astrakhan Technical Institute for Fisheries, USSR, 1981, Dissertation to the Graduate Faculty of the University of Georgia, Athens Georgia 1998.
"Extended Shelf Life Refrigerated Foods: Microbiological Quality and Safety," Elmer H. Marth, Food Technology, vol. 52, No. 2, Feb. 1998.
"Post Processing Pasteurization of Processed Meats," E. Jeffery Rhodehamel, et al., 2nd Annual Reciprocal Meat Conference, Jun. 20-23, O.S.U., Stillwater, OK.
"Basic aspects of food preservation by hurdle technology," Lothar Leistner, International Journal of Food Microbiology, 55 (2000).
McGuckian, A.T., The AGS Food System—Chilled Pasteurized Food. Cornell Hotel and Restaurant Administration Quarterly, 1969, 10 (1), 87-92, 99, May 31, 1969.
Mulder, R.W., et al., The microbiological shelf life of vacuum packed broiled chickens. Spiederholt Institute for Poultry Research, Beekbergen, Netherlands. Archiv fuer Lebensmittelhygiene 25(5): 108-111, May 31, 1974.
Delaquis, P.J., et al., Microbiological stability of pasteurized ham subjected to a secondary treatment in retort pouches. Journal of Food Protection. 1986. 49:42-46, Jan. 31, 1986.
Alkar, Alkar Sales Activity Report re Malton Bacon Factory, Jun. 16, 1999.
Leistner, Food preservation by ccombined methods. Food Research International, 1992, 25: 151-158, Dec. 31, 1992.
Leistner, et al., Food Preservation by Hurdle Technology. Proceedings of the 1993 Food Preservation 2000 Conference, Oct. 21, 1993.
Leistner, et al., "Food preservation by hurdle technology," Trends in Food Science & Technology, vol. 6, pp. 41-45, Feb. 28, 1995.
Gould, et al., New Methods of Food Preservation (Overview—Gould, 1—Principles and Applications of Hurdle Technology—Leistner, 9—Effect of Heat and Ultrasound on Microorganisms and Enzymes—Sala, et al), Dec. 31, 1995.
Marth, "Extended Shelf Life Refrigerated Foods," Food Technology, vol. 52, No. 2, Feb. 1998.
Leistner, et al., Combined Methods for Food Preservation. Handbook of Food Preservation, Marcel Dekker, Inc., New York, NY, 1999, Jan. 21, 1999.

Leistner, "Basic aspects of food preservation by hurdle technology," Intl. Journal of Food Microbiology, 55 (2000), pp. 181-186, Apr. 10, 2000.

Muriana, "Post-Process Surface Pasteurization Ready-To-Eat Meats," 2002 Meat Industry Conference, Oct. 24-26, 2002.

Stanek (Cryovac), Precooked Pork Loin for Further Process. Memo to A.R. Dorsey, CC: JF Moore, Feb. 17, 1986.

DeMasi, et al., U.S. Statutory Invention Registration for "Post-Pasteurization", Apr. 7, 1989.

Shackelford, et al., Effects of Blade Tenderization, Vacuum Massage Time and Salt Level on Chemical, Textural and Sensory Characteristics of Precooked Chuck Roasts. Journal of Food Science, 1989, 54(4): 843-905, Dec. 31, 1989.

Hardin, et al., Survival of *Listeria monocytogenes* in Postpasteurized Precooked Beef Roasts. Journal of Food Protection vol. 56, No. 8, 655-660, Aug. 31, 1993.

Cooksey, et al., "Reduction of *Listeria monocytogenes* in Precooked Vacuum-Packaged Beef Using Postpackaging Pasteurization." J. Food Prot. 56:1034-1038, Dec. 31, 1993.

Shaw, et al., Extending the Shelf-Life of Chilled Ready Meals. Meat Quality and Meat Packaging Edited by Sandy A. Taylor, Antonio Raimundo, Maurizio Severine and Frans J.M. Smulders, Dec. 31, 1996.

Rhodehamel, et al., "Post Processing Pasteurization of Processed Meats," Proc. 52d Annual Reciprocal Meat Conference, vol. 52, pp. 113-114, Jun. 23, 1999.

Asselberg, E.A., et al., Studies on the Application of Infrared in Food Processing. Food Technology 14:449-453, 1960.

Ginzburg, "Application of Infra-red Radiation in Food Processing" Dec. 31, 1969.

Dagerskog, Infra-red radiation for food processing II. Calculation of heat penetration during infra-red frying of meat products. Lebensmittel Wissenschaft und Technologie, 1979, 12 (5) : 252-257, Dec. 31, 1979.

Blankenship, et al., Cooking Methods for Elimination of *Salmonella typhimurium* Experimental Surface Contaminant from Rare Dry-Roasted Beef Roasts, Dec. 31, 1980.

Sandu, Constantine, Infrared Radiative Drying in Food Engineering: A Process Analysis. Biotechnology Progress, Sep. 1986, 2(3): 109-119, Sep. 30, 1986.

Hallstrom, Bengt, et al., Heat Transfer and Food Products (Infrared Ovens), Elseview Science Publishing Co. Inc., New York, NY, 1988, pp. 215-221, 222-229, Dec. 31, 1988.

Forney et al., "Radiant Wall Oven Applications" web page of Pyramid Manufacturing, Inc., Dec. 31, 1996.

Hanson, "Reducing Process Variation in the Cooking and Smoking Process", Jul. 2, 1997.

Unitherm, Unitherm Bulletin—Update on browning and cooking in the RapidFlow Oven, Jul. 16, 1997.

Unitherm, "Smoking and Browning under 10 minutes!," advertisement in Meat & Poultry magazine, Apr. 28, 1998.

Islam, "Shelf Life Extension and Pathogen Reduction of Fresh Chicken through Surface Pasteurization Using Radiant Heat and Anti-Microbial Agents", Dec. 8, 1998.

Cargill, Product Specification for Riverside Smoked Deli product, Jun. 26, 1992.

Unitherm, "Pasteurization protection," showing publicc use in 1997 at Plainville Farms, Plainville, NY, Dec. 31, 1997.

Hanson, "Brine Chilling of Roasted Pork and Poultry Prodducts for Bil Mar Foods", Dec. 14, 1995.

Alkar, Bil Mar Zeeland, MI Serpentine Chiller Plant Layout, Mar. 4, 1996.

Hanson, "Post packaging pasteurization," Alkar memo to Bil Mar, Jun. 25, 1998.

Bil Mar, Food Service Brochure for Sara Lee Turkey products, Dec. 29, 1998.

Bil Mar, "Priority List by SKU for Post Pasteurization . . .", Dec. 29, 1998.

Bil Mar, "Surface Thermal Processing Product List", Jan. 7, 1999.

Wasson, Alkar Sales Activity Report re Bil Mar Zeeland, MI plant, Jan. 7, 1999.

Betley, Alkar "Pasteurization Tests for Bil Mar Foods", Jan. 20, 1999.

Wasson, Alkar Sales Activity Report re Bil Mar Zeeland, MI plant, Feb. 19, 1999.

Alkar, Proposal for . . . Serpentine Hot Water Pasteurization Zone . . ., Jun. 3, 1999.

Bil Mar, Purchase Order for Serpentine Hot Water Pasteurization Zone . . . for Bil Mar Zeeland, MI, Jun. 4, 1999.

Alkar, Bil Mar Zeeland . . . Pasteurizer/Chiller Plant Layout, Jul. 12, 1999.

Saramar, LLC, U.S. Trademark App. for Stamp Design, Apr. 19, 1999.

U.S. Appl. No. 10/668,003, filed by David Howard, "Method for Surface Pasteurization of Meat Products," filed Sep. 22, 2003; Office Action mailed Aug. 18, 2006, wherein claims 1-23 stand rejected.

U.S. Appl. No. 10/947,558, filed by David Howard, "Freeze-Crusting to Reduce Pathogens on Cooked Food Products," filed Sep. 22, 2006.

U.S. Appl. No. 10/970,019, filed by David Howard, "Reducing Live Pathogens on Precooked Wieners and Sausages," filed Oct. 21, 2004.

Blankenship, L.C., et al., Cooking Methods for Elimination of *Salmonella typhimurium* Experimental Surface Contaminant From Rare Dry-Roasted Beef Roasts, 1980, vol. 45, Publisher: Journal of Food Science, Published in: United States.

Ginzburg, A.S., Professor, Application of Infra-red Radiation in Food Processing, 1969, Publisher: Chemical and Process Engineering Series, Published in: United States.

Pasteurizing Protection, Apr. 1, 1999, Publisher: The National Provisioner, Published in: United States.

Shackelford, et al., Effects of Blade Tenderization, Vacuum Massage Time and Salt Level on Chemical Textural and Sensory . . ., 1989, vol. 54, No. 4, Publisher: Journal of Food Science, Published in: United States.

USDC Western District, Oklahoma, Summary Judgment Order, Case No. CIV-01-347-C, Unitherm Food Systems v. Swift-Echrich, Inc, Aug. 19, 2002, Published in: United States.

Smoking & Browning Under 10 Minutes—Unitherm Advertisement, use beginning prior to Feb. 22, 2001, Published in: United States.

Description of Unitherm browning system, use beginning prior to Feb. 22, 2001, Published in: united States.

Unitherm Bulletin-Browning in Traditional Continuous Ovens, use beginning prior to Feb. 22, 2001, Feb. 22, 2001, Published in: United States.

* cited by examiner

SURFACE PASTEURIZATION OF COOKED FOOD PRODUCTS

This application is related to co-pending provisional patent application Ser. No. 60/358,981, filed Feb. 22, 2002, entitled "SURFACE PASTEURIZATION OF COOKED FOOD PRODUCTS."

FIELD OF THE INVENTION

The present invention relates to processes for preventing food-borne illnesses by pasteurizing the surfaces of cooked food products.

BACKGROUND OF THE INVENTION

In spite of increasingly stricter government regulations and ongoing efforts in the meat, fish and poultry industries, outbreaks of illnesses caused by food-borne bacteria continue to occur on a regular basis. In 1999 alone, 25 people in the United States died as a result of consuming contaminated meat or poultry products. The presence of any illness-causing bacteria on ready-to-eat (RTE) and other precooked meat, poultry, and fish products (e.g., sliced or sliceable ham, beef, or turkey logs or whole muscle products, Virginia hams, oven-roasted turkey, spiral honey-baked hams, etc.) is of particular concern because these products typically are not recooked or sufficiently reheated prior to consumption.

The threat posed to public health and safety by food-borne pathogens is extremely wide-spread and the economic impact of even a single outbreak can be staggering. Recently, one company issued a voluntary recall of approximately 16.7 million pounds of RTE turkey and chicken products because of possible contamination problems at just one of the company's processing facilities. It is reported that possible contamination problems were traced to the facility following the occurrence of certain illnesses identified by state health departments. The recalled products had been distributed nationwide and to some foreign countries.

Examples of particularly serious bacterial contaminants include *Listeria, salmonella,* and *E-coli*. These contaminants are especially problematic when dealing with RTE and other precooked meat, poultry and fish products and are often present in processing environments in spite of diligent efforts to eliminate them. *Listeria monocytogenes,* for example, is tolerant to salt, can grow at low temperature, has a high heat tolerance, and can form stubborn biofilms on processing surfaces.

When dealing with RTE and other precooked products, the risk of contamination is particularly high after cooking and prior to completing the final packaging process. Such meat, poultry, and fish products are typically cooked to an internal temperature of at least 160° F. so that, at the end of the cooking process, no *listeria, salmonella,* or *E-coli* should be present. However, prior to packaging, the cooked product will typically be chilled or otherwise allowed to cool to an internal temperature of about 40° F. or less and can be contaminated by airborne and other pathogens and/or bacteria present in the air, on conveyor surfaces, on processing equipment, in condensate drippage, or on the hands of workers in the processing area.

In response to continuing outbreaks of food-borne illnesses, governmental regulatory agencies continue to impose stricter regulations. USDA and FDA authorities have now established zero tolerance requirements for *listeria monocytogenes* and *salmonella* in all RTE food products.

Unfortunately, as evidenced by the continuing occurrence of illnesses and deaths from food-borne bacteria, many current industry practices and procedures are not sufficiently reliable and are inadequate to meet the zero tolerance requirements now imposed by regulatory agencies. Current procedures commonly consist of maintaining the cooked product in a "clean" environment (a "clean room") and conveying the product along a critical control path designed to prevent bacteria from reaching the product surfaces. In an effort to keep the processing environment clean, the air within the clean environment is typically filtered and operators are instructed to wash all contact surfaces between shifts and to wash their hands each time they enter the clean area.

It is thus apparent that a need presently exists for a process which will consistently and effectively kill surface bacteria present on food products, particularly on RTE and other precooked meat, poultry, and fish products, and will meet and exceed all governmental regulatory requirements. A need particularly exists for such a process which will not alter the surface characteristics or internal characteristics of the products in any significant way.

SUMMARY OF THE INVENTION

The present invention provides a surface pasteurizing system which satisfies the needs and alleviates the problems discussed above. The inventive system can be used for pasteurizing the surface of generally any raw or cooked food product and is particularly well suited for treating precooked whole muscle, emulsified, or other meat, poultry and fish products. The inventive system is effective for destroying bacteria without producing any substantial change in the color or other characteristics of the product. The inventive system is also effective for addressing any recontamination of the product surface which may have occurred prior to or during packaging.

In one aspect, the present invention provides a method of treating a cooked food product to prevent food-borne illness wherein the cooked food product has an outer surface and an internal core temperature and the cooked food product is contained in packages. The method comprises the steps of: (a) heating the packages of the cooked food product with water at a temperature and for a time effective to obtain an outer surface temperature of at least 155° F. and then (b) cooling the packages of the cooked food product to reduce the outer surface temperature. Steps (a) and (b) are preferably each conducted in a manner such that, during steps (a) and (b), the internal core temperature never increases by more than 10° F.

In another aspect, the present invention provides a method of treating a cooked food product to prevent food-borne illness wherein the cooked food product has an outer surface and an outer surface temperature and the food product is contained in packages. The method comprises the steps of: (a) continuously conducting the packages of the cooked food product through water having a water temperature of at least 185° F. such that the outer surface temperature is increased and then (b) continuously conducting the packages of the cooked food product through a cooler such that the outer surface temperature is reduced.

In yet another aspect, the inventive process can include the steps, prior to heating the packages of cooked food product in water, of: (i) prior to placing the cooked food product in the packages, delivering the cooked food product through a continuous oven at a temperature and for a time effective for increasing the outer surface temperature to at least 155° F. without increasing the internal core temperature by more than 5° F. and then (ii) placing the cooked food product in the packages. The continuous oven employed in step (i) is preferably an infrared oven. Further, all of the steps of the inventive process are most preferably conducted in a manner such that substantially no change in surface color and substantially no change in internal core temperature occur.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENTS

As indicated above, the inventive surface pasteurization process is effective for treating generally any type of cooked or raw food product. The inventive process is particularly well suited for treating ready-to-eat and other precooked meat, poultry and fish products. Examples of precooked (i.e., already cooked) products particularly well suited for treatment by the inventive process include, but are not limited to: Virginia hams, spiral honey-baked hams, oven-roasted turkey or turkey portions, whole muscle deli turkey, whole muscle deli ham, oven-roasted chicken or chicken portions, and processed slicing logs (e.g. ham, beef or turkey logs). In fact, the inventive process can even be employed for treating packages of wieners and similar products.

The inventive process comprises the step, after the already cooked food product has been placed in a bag or other packaging, of exposing the packaged product to an elevated temperature for a period of time effective to achieve a desired bacteria kill rate (lethality rate) or kill ratio on the surface of the product. For example, the temperature and time of exposure employed in the inventive process could be selected for achieving at least a 3 log reduction, more preferably at least a 4 log reduction, in Listeria on the product surface. In addition, the temperature and exposure period employed in the inventive process will most preferably be effective for achieving the desired results without producing any substantial (i.e., no readily visible) change in the surface color of the product and no substantial (i.e., not readily discernible) change in the other characteristics (e.g., texture, moisture content, color, taste, and shape) of the product.

To ensure that an acceptable kill rate is achieved, the surface of the product within the packaging will typically be heated to at least 155° F. and will preferably be heated to at least 160° F. The surface will more preferably be heated to at least 170° F. and will most preferably be heated to at least 175° F. In addition, the temperature, residence time, and manner of heating employed in the inventive process will preferably be effective for heating the surface of the packaged product to the desired temperature without producing more than a 10° F., more preferably not more than a 5° F., increase in temperature at the center most internal core of the product. The inventive process will most preferably be conducted such that substantially no increase in core temperature (i.e., no more than a 1° F. increase) occurs.

As will be understood by those skilled in the art, manual or automatic processes and systems are commonly employed for packaging poultry, meat, and fish products after cooking. Cooked products such as hams, turkeys, whole muscle deli turkey, whole muscle deli ham, emulsified slicing logs, and similar products are commonly packaged in watertight, sealed bags after cooking using a CRYO-VAC 8600 packaging machine or similar system.

Cooked products of the type mentioned above will typically be chilled prior to packaging but can also be packaged hot. If chilled before and/or after packaging, the initial surface temperature and the initial core temperature of the packaged cooked products at the start of the inventive process will typically not be greater than 60° F. and will preferably not be more than 40° F. The inner core temperature of the packaged cooked product prior to processing in accordance with the present invention will most preferably be about 35° F.

If, on the other hand, the cooked product has been packaged hot with no chilling, the packaged cooked product processed in accordance with the present invention could have an initial outer surface temperature of as much as 140° F.

Figure 1:
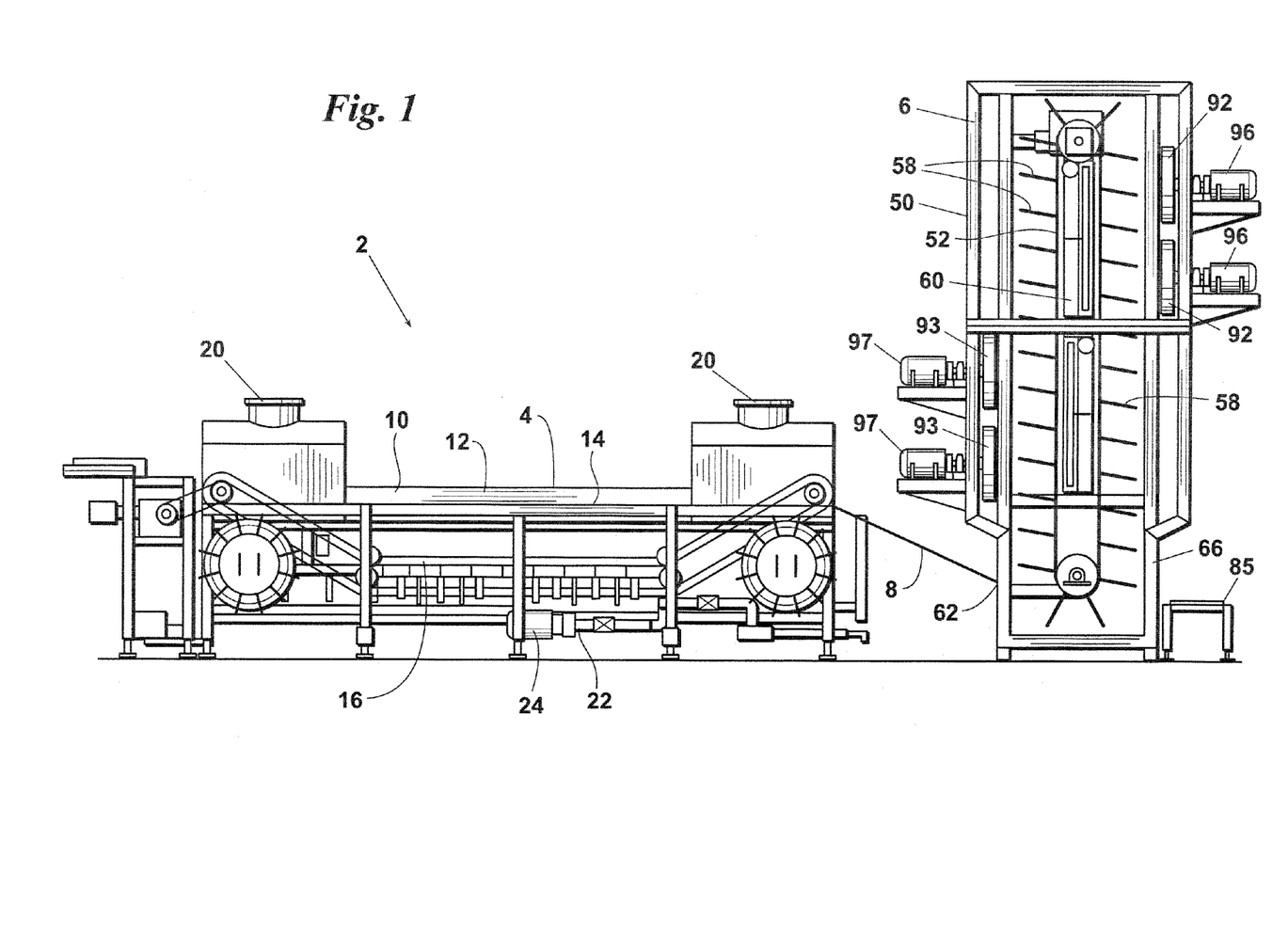
FIG. 1 schematically illustrates an embodiment 2 of the inventive pasteurization process and system.

An embodiment 2 of the inventive pasteurization process and system is depicted in FIG. 1. Inventive system 2 preferably comprises: a water bath cooker 4 wherein the packaged, cooked food product is preferably completely submerged in hot water; a continuous chiller 6; and a gravity feed chute 8 which preferably delivers the packaged product directly from the water bath 4 to the chiller 6.

As an alternative to water bath cooker 4, the packaged product could be conveyed through a hot water deluge, a hot water spray, or other hot water system capable of heating the outer surface of the product without causing a significant increase in product core temperature. As indicated above, the temperature and configuration of the water bath cooker or other hot water system 4 and the residence time of the packaged cooked food product therein will also preferably be such as to achieve a desired lethality rate (i.e., a desired degree of contaminant reduction) on the outer surface of the cooked product contained in the packaging without producing any substantial change in surface color.

The water employed in the water heating step or stage of the inventive process will preferably have a temperature of at least 185° F. The water will more preferably have a temperature of at least 190° F. and will most preferably have a temperature of about 205° F. The duration of the water heating step (e.g., the residence time of the packaged cooked product in the water bath cooker 4 or other hot water system) will preferably be less than seven minutes and will more preferably be not more than four minutes. The duration of the water heating step will most preferably be not more than three minutes.

To assist in preventing any change in surface color and to minimize heat migration into the interior of the product, the packages of cooked product are preferably transferred from the hot water system 4 to the chiller 6 within not more than two minutes. The packaged cooked product will more preferably be delivered into chiller 6 in not more than 1.5 minutes and will most preferably be delivered into chiller 6 in not more than 1 minute after exiting the hot water system.

An example of a hot water system 4 particularly well suited for use in the inventive process is the AQUAFLOW water bath cooker available from Unitherm Foods Systems, Inc. As illustrated in FIG. 1, the AQUAFLOW water bath cooker 4 comprises: an elongate insulated housing 10 having a liftable cover 12; a conveyor 16 which carries the packages of cooked food product beneath the water level; a plurality of hold down bars or rails (not shown) positioned above the carrying run of conveyor 16 for holding the packages of cooked food product beneath water level 14; a pair of overhead ducts 20 provided in housing 10 above the inlet and outlet openings thereof for venting hot air and water vapor away from the apparatus; and a fluidized bed sparge assembly 22.

The conveyor 16 employed in water bath cooker 4 is preferably a hinged conveyor which allows convenient cleaning and service. The fluidized bed sparge system 22 operates to provide uniform heat transfer to all surfaces of the product throughout the bath cooker and to prevent temperature stratification.

The continuous chiller employed in the inventive process can generally be any type of chiller effective for cooling the outer surface of the packaged cooked product such that substantially no change in the color of the surface is allowed to occur and heat migration into the product is arrested so that the core temperature of the product is not allowed to increase by more than 10° F. As mentioned above, the core temperature of the product preferably will not increase by more than 5° F. and most preferably will not substantially increase at all.

The continuous chiller employed in the inventive process will preferably be effective for returning the outer surface of the product to its temperature prior to the water heating step or less. The continuous chiller will more preferably be effective for cooling the surface of the cooked product contained in the packaging to 45° F. or less and will most preferably be effective for cooling the product surface to 40° F. or less. In a particularly preferred embodiment, the continuous chiller will be effective for cooling the product to a temperature of about 35° F.

It is also preferred that the continuous chiller 6 be effective for completing the cooling step within 30 minutes or less. The continuous chiller will more preferably be effective for completing the cooling step in 20 minutes or less and will most preferably be effective for completing the cooling step in not more than 15 minutes.

Examples of continuous chillers which can be used in the inventive process include, but are not limited to: cryogenic coolers such as nitrogen and carbon dioxide cooling systems; brine or water chillers; and circulating air coolers. Nitrogen and carbon dioxide chillers may in some cases adversely affect the product surface and are very expensive to operate. With respect to cost, the use of a nitrogen or carbon dioxide cooling system can add from about one-half to about three cents per pound per the cost of the product.

Brine or water chillers also have certain shortcomings which make them less preferred for use in the inventive process. Brine and water chillers will typically require from about 45 minutes to about one hour to complete the cooling process. In addition, brine and water chillers are typically very large devices which require a great deal of plant space.

The continuous chiller employed in the inventive process will preferably be a continuous, circulating air cooler. Examples of suitable continuous, circulating air systems include, but are not limited to, spiral coolers, impingement chillers, and vertical chillers. The circulating air chiller employed in the inventive process will preferably be either a linear impingement chiller or a vertical chiller and will most preferably be a vertical chiller. Linear impingement chillers and vertical chillers of the type described hereinbelow provide a greater degree of cold air turbulence than is provided by a typical spiral cooler and will cool the packaged cooked product in a much shorter period of time.

A circulating air chiller employed in the inventive process will preferably use ammonia, Freon, or other common refrigerant and will preferably provide an average air temperature of 0° F. or less. The circulating air chiller will more preferably provide an average air temperature of −10° F. or less and will most preferably provide an average air temperature of −15° or less. The circulating air chiller will also preferably provide a sufficient degree of convection, impingement, or other type of circulation to complete the cooling process in less than 30 minutes and will most preferably be effective for completing the cooling process in 15 minutes or less. By using a common refrigerant, the circulating air chiller will typically add as little as 0.1 ¢ per pound to the cost of processing the product.

Figure 2:
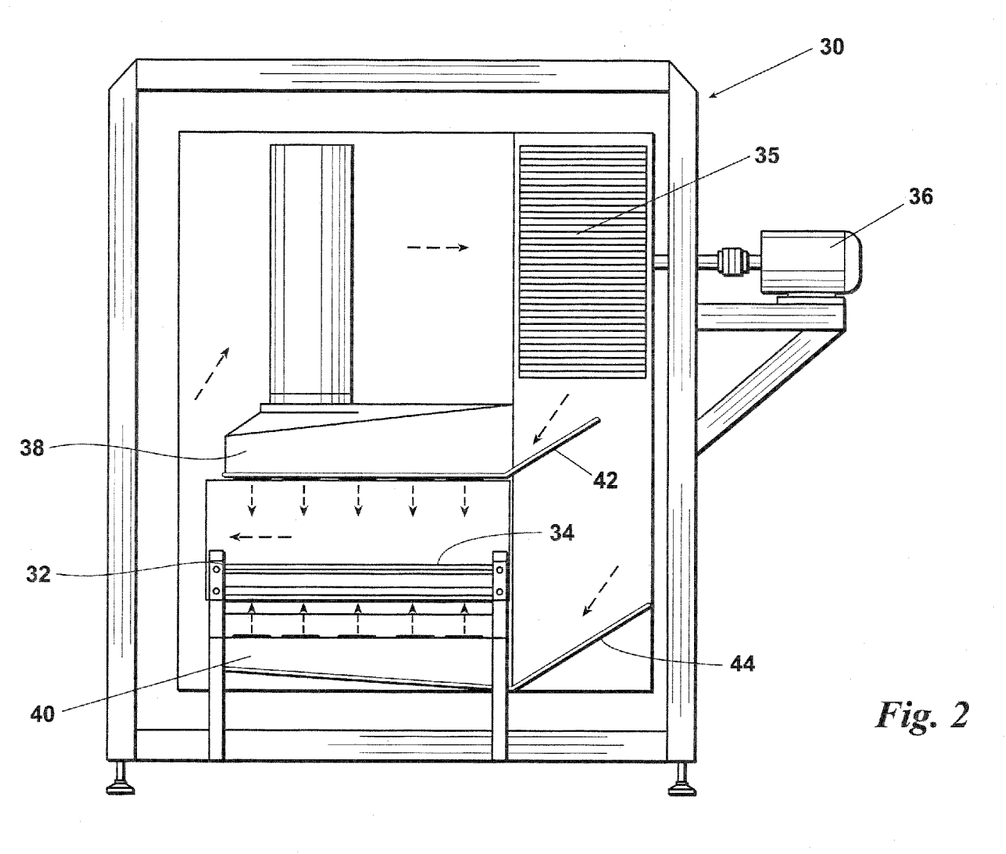
FIG. 2 provides a cutaway, elevational, inlet end view of a linear impingement chiller 30 particularly well suited for use in the inventive process.

An example of an impingement chiller 30 preferred for use in the inventive process is the Unitherm Linear Impingement Chiller illustrated in FIG. 2. The linear impingement chiller 30 comprises: a linear internal conveyor 32 having a perforated belt 34 (preferably formed of modular plastic or stainless steel); an internal refrigerating unit 35 including a refrigerant evaporator coil and one or more air circulation fans; external fan motors 36; an upper air delivery duct 38 positioned above conveyor 32 and having nozzles, orifices, or other impingement flow structures for delivering the chilled air downwardly onto the product; a similar lower duct 40 for delivering the chilled air upwardly onto the product through perforated belt 34; and internal air flow ducts, baffles, or panels 42 and 44 which direct the chilled air from the refrigerating unit 35 into the upper and lower ducts 38 and 40.

The impingement chiller 30 will preferably be operated using a common refrigerant such as ammonia or Freon and, depending upon the particular refrigerant used, can provide chilled air temperatures in the range of from about −20° F. to about −40° F. or less. Average wind chill temperatures within the unit can be as low as −90° F. or less.

Figure 3:
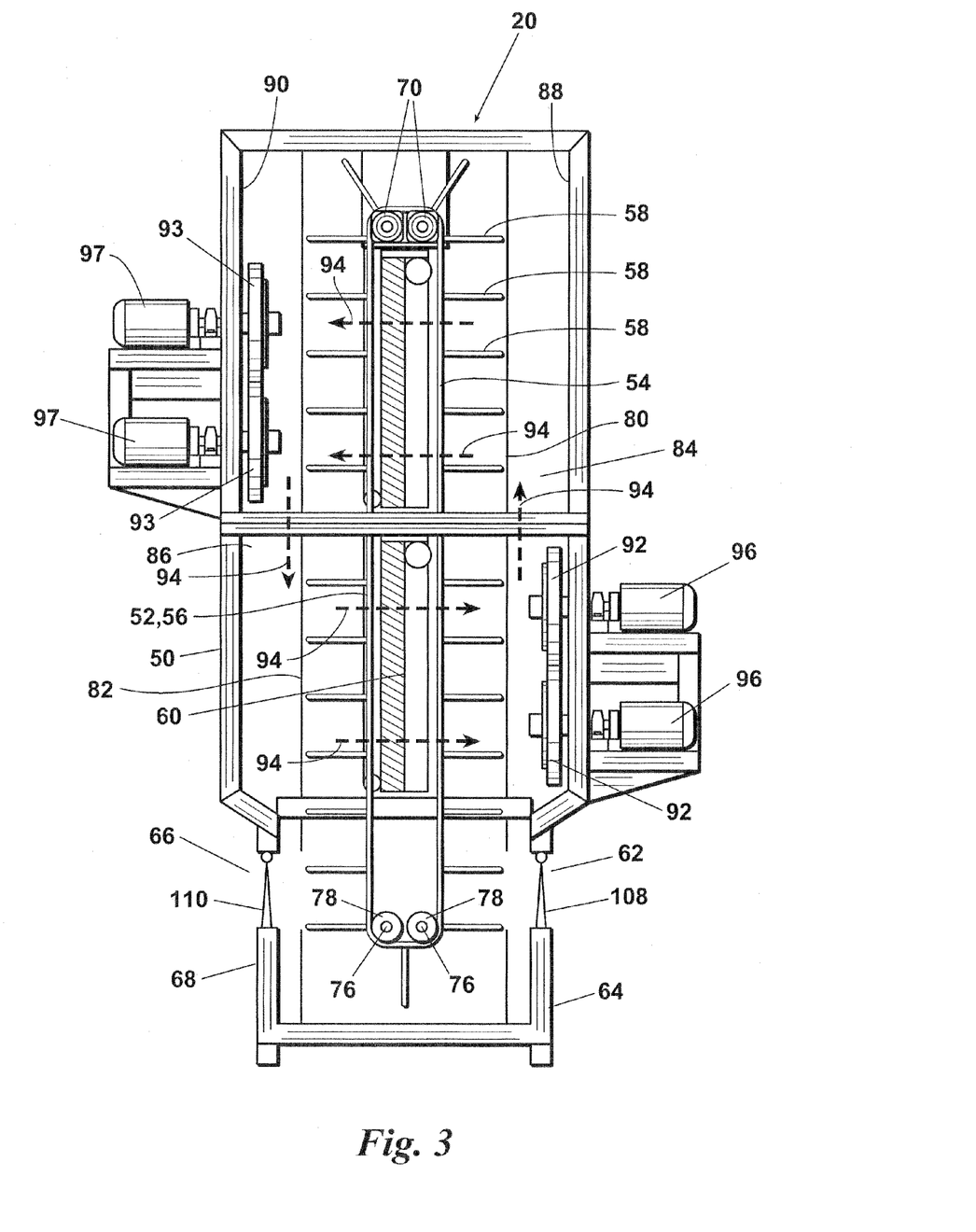
FIG. 3 provides a schematic, cutaway, elevational end view of a vertical chiller 6 preferred for use in the inventive process.
Figure 4:
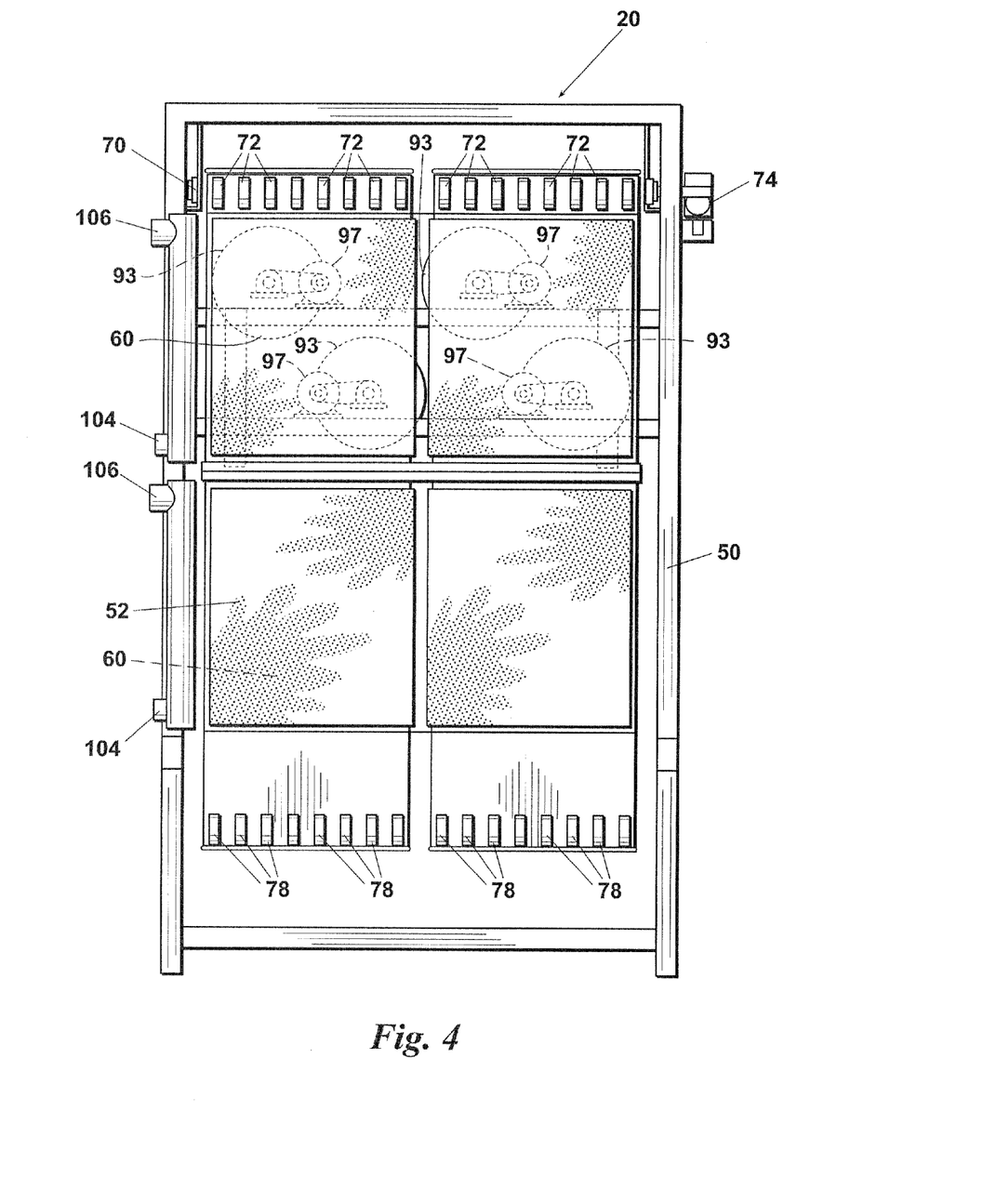
FIG. 4 provides a schematic, cutaway, elevational front view of vertical chiller 6.

The continuous chiller employed in inventive system 2 is most preferably a vertical circulating air chiller 6 of the type illustrated in FIGS. 1, 3, and 4. The particular vertical chiller 6 illustrated in these figures is available from Unitherm Food Systems, Inc. and preferably comprises: an insulated housing 50; one or more internal vertical conveyors 52 rotatably installed in housing 50 and having an upward path 54 and a downward path 56; a plurality of outwardly extending, lateral carrier flights or finger rows 58 included on vertical conveyor(s) 52; a vertical refrigerating element (preferably an evaporator) 60, or a plurality of stacked elements 60, sandwiched between the upward and downward paths 54 and 56 of the vertical conveyor(s) 52; an inlet opening 62 provided through the lower portion of the front wall 64 of housing 50; an outlet opening 66 provided in the bottom portion of the back wall 68 of housing 50; a pair of drive shafts 70, one preferably being directly driven and the other preferably being slave or belt driven, rotatably extending longitudinally through the upper portion of freezer housing 50 and having a plurality of sprockets 72 secured thereon for engaging and driving vertical conveyor(s) 52; a drive motor 74 secured outside of freezer housing 50 and having a drive shaft operably connected or linked to at least one of the drive shafts 70; and a pair of idler shafts 76 rotatably extending longitudinally within the lower portion of the housing and having sprockets 78 secured thereto for engaging and guiding the lower end of vertical conveyor(s) 52.

Vertical chiller 6 preferably also comprises: perforated, vertical interior front and back walls 80 and 82 which allow air flow but enclose the distal ends of carrier structures 58 to prevent product from falling off of the outer ends thereof; vertical front and back plenums 84 and 86 defined respectively by the vertical spaces created between perforated interior panels 80 and 82 and the vertical front and back walls 88 and 90 of housing 50; a plurality of fans 92 positioned within the lower portion of front plenum 84; a plurality of additional fans 93 positioned within the upper portion of back plenum 86; a corresponding plurality of motors 96 and 97 mounted outside of housing 50 for driving fans 92 and 93; and a pair of flexible curtains 108 and 110, preferably plastic strip curtains of a type well-known in the art, positioned in the inlet and outlet openings 62 and 66 of housing 50 which allow product to pass therethrough but reduce cold air losses from the chiller openings.

Fans 92 and 93 are preferably positioned to continuously circulate air through vertical conveyor(s) 52 and vertical cooling element(s) 60 in the manner indicated by flow cycle arrows 94.

Figure 5:
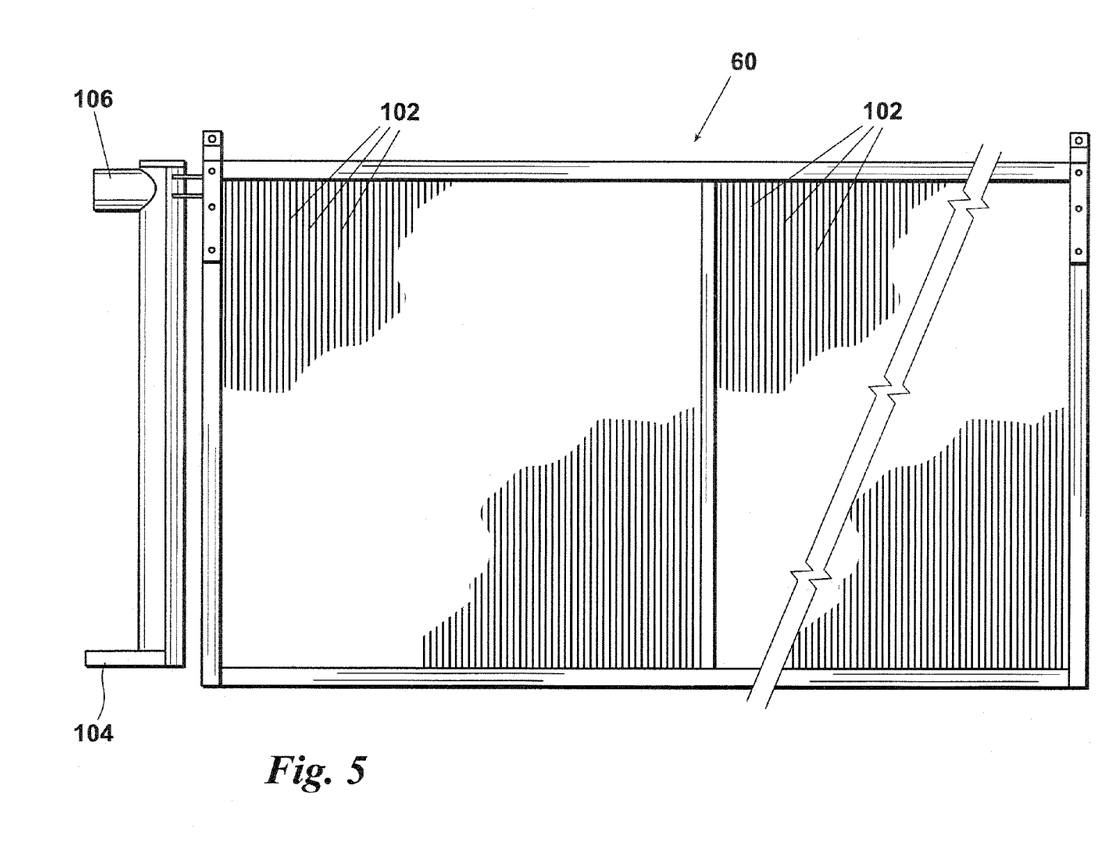
FIG. 5 provides an elevational side view of a refrigerating element 60 employed in vertical chiller 6.
Figure 6:
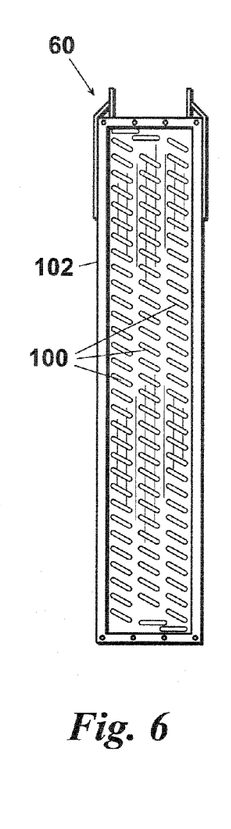
FIG. 6 provides an elevational end view of refrigerating element 60.

As will be understood by those skilled in the art, various types of refrigerating elements could be used in the vertical chiller 6. A refrigerating element 60 of a type particularly preferred for use in vertical chiller 6 is depicted in FIGS. 5 and 6. Refrigerating element 60 is an evaporative coil-type element comprising coolant coils 100, which loop back and forth horizontally, and a plurality of closely spaced, laterally oriented, vertical fins or plates 102 through which the coils 100 are received and retained.

Coolant is circulated through vertical refrigerating element 60 via a lower conduit 104 which delivers cold liquid refrigerant into the bottom of cooling element 60 and a larger upper conduit 106 which receives the warmer, at least partially vaporized, return coolant from the upper end of refrigerating element 60. The return coolant is delivered through a typical external compression and heat removal system (not shown) and then recirculated through refrigerating element 60.

As will be understood by those skilled in the art, air flow rates, air temperatures, and resulting wind chill factors within vertical chiller 6 can be varied and controlled by, for example, using either variable speed fan motors or constant speed motors equipped with inverters. A variable speed conveyor motor 74 can also be used to adjust and control the residence time of the product in chiller 6.

Fans 92 and 93 will preferably be sized and operated to provide an air flow velocity through refrigerating element(s) 60 in the range of from about 1000 to about 8000 feet per minute. The air flow velocity established through refrigerating element(s) 60 will most preferably be about 2,000 feet per minute.

During the inventive process, the average air temperature within vertical chiller 6 will preferably be less than 0° F. and will more preferably be in the range of from about $-100°$ F. to about $-50°$ F. If an ammonia or Freon coolant is employed, the temperature in vertical chiller 6 during the inventive process will typically be in the range of from about $-15°$ F. to about $-40°$ F.

In addition, air circulation rates within vertical chiller 6 will preferably be controlled such that the average wind chill temperature experienced by each product as it is conveyed up and down within vertical chiller 6 will be less than $-25°$ F. and will more preferably be less than about $-45°$ F. The average wind chill temperature experienced by the packaged product in vertical chiller 6 will typically be in the range of from about $-55°$ F. to about $-90°$ F.

In vertical chiller 6, the packages of cooked product are contacted by cold circulating air as they travel along upward path 54. At the top of upward path 54, the vertical conveyor(s) 52 turn on drive shafts 70 to begin their downward path 56. As the product packages are carried around the turn at the top of vertical conveyor(s) 52, the products are desirably inverted (i.e., turned over). Circulating cold air contact with the packages of product continues as they move down the downward path 56. Inverting the product in this manner at the mid-point of the cooling operation ensures that the product is subjected to a much more thorough and equivalent degree of air contact than would otherwise occur if the product remained in the same position throughout the entire operation.

As the cooled packaged products reach the bottom of downward path 56, the products can simply slide onto a product conveyor 85 as the carrier structures begin the turn around the lower idler shafts 76.

Figure 7:
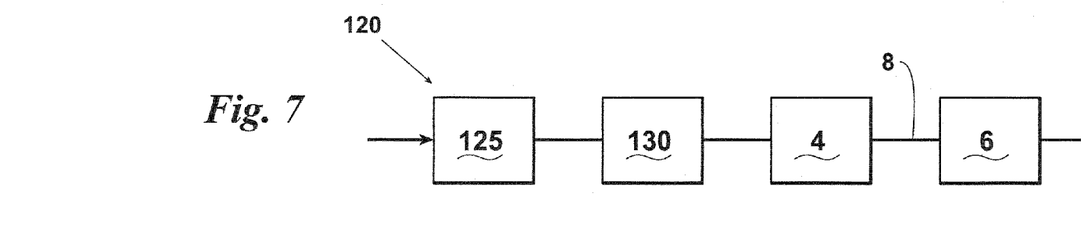
FIG. 7 schematically illustrates an alternative embodiment 120 of the inventive process and system.

An alternative embodiment 120 of the inventive surface pasteurization process and system is depicted in FIG. 7. In embodiment 120, the surface of the already cooked food product is decontaminated both before and after packaging. Embodiment 120 is identical to embodiment 2 except that embodiment 120 includes the machine 130 used for packaging the cooked product and also includes a continuous oven 125 positioned upstream of the packaging machine 130. Oven 125 can be the oven wherein the product is cooked but will preferably be a second oven such that already cooked food product is conducted through both the continuous oven 125 and the packaging machine 130 prior to being conducted through the hot water system 4.

The packaging machine 130 employed in inventive process 120 can be a CRYOVAC Model 8600 unit or any other type of packaging system employed in the art. Alternatively, the food product could be packaged by hand.

Assuming that continuous oven 125 is not the cooking oven, the oven 125 employed in embodiment 120 can generally be any type of continuous oven which is operable in a manner effective for increasing the outer surface temperature of the already cooked food product (which has not yet been packaged) sufficiently (typically to at least 155° F.) to obtain a desired lethality rate on the product surface without increasing the internal core temperature of the product by more than 5° F. The continuous oven 125 will preferably be operable for heating the outer surface of the cooked food product such that substantially no change in surface color and substantially no increase in core temperature occur.

In the continuous oven 125, the already cooked product will preferably be exposed to a temperature of at least 500° F. The cooked product will more preferably be exposed to a temperature of at least 700° F. and will most preferably be exposed to a temperature of at least 750° F. In a particularly preferred embodiment, the surface of the product will be exposed to an average temperature of about 1000° F.

The continuous oven 125 will preferably be operable for heating the surface of the already cooked product to a temperature of at least 160° F. The continuous oven 125 will more preferably be operable for heating the surface of the cooked product to a temperature of at least 170° F. and will most preferably be operable for heating the surface of the cooked product to a temperature in the range of from about 180° F. to about 250° F.

To minimize heat migration into the product, the continuous oven 125 will also preferably be operable for providing the desired surface temperature in three minutes or less. The continuous oven 125 will more preferably be operable for achieving the desired surface temperature in not more than two minutes and will most preferably be operable for providing the desired surface temperature in not more than one minute.

To prevent recontamination of the product surface after treatment in the continuous oven 125, product will preferably be packaged in continuous packaging device 130 within not more than 10 minutes from exiting continuous oven 125. The cooked product will more preferably be packaged in no more than one minute and most preferably within about 15 seconds or less after exiting oven 125.

Within 60 seconds of exiting continuous oven 125 and prior to entering the hot water system 4, the outer surface of the cooked product will typically fall to less than 140° F. and will more typically fall to less than 100° F. In most cases, the core temperature of the cooked product entering continuous oven 125 will not be greater than 60° F.

The continuous oven 125 employed in inventive process 120 will preferably comprise a high intensity heat source. Additionally, the continuous oven 125 will preferably be constructed and operated such that air flow therein is minimized. Minimizing or eliminating turbulence within the heating apparatus reduces the degree to which heat is conducted to the interior of the product.

The continuous oven 125 employed in embodiment 120 of the inventive process will most preferably be an infrared oven (e.g., an electric infrared oven or a gas infrared oven). The high intensity heat provided by an infrared oven can quickly heat the surface of the product to the desired pasteurization temperature without changing the surface color, internal temperature, or other characteristics of the product.

Figure 8:
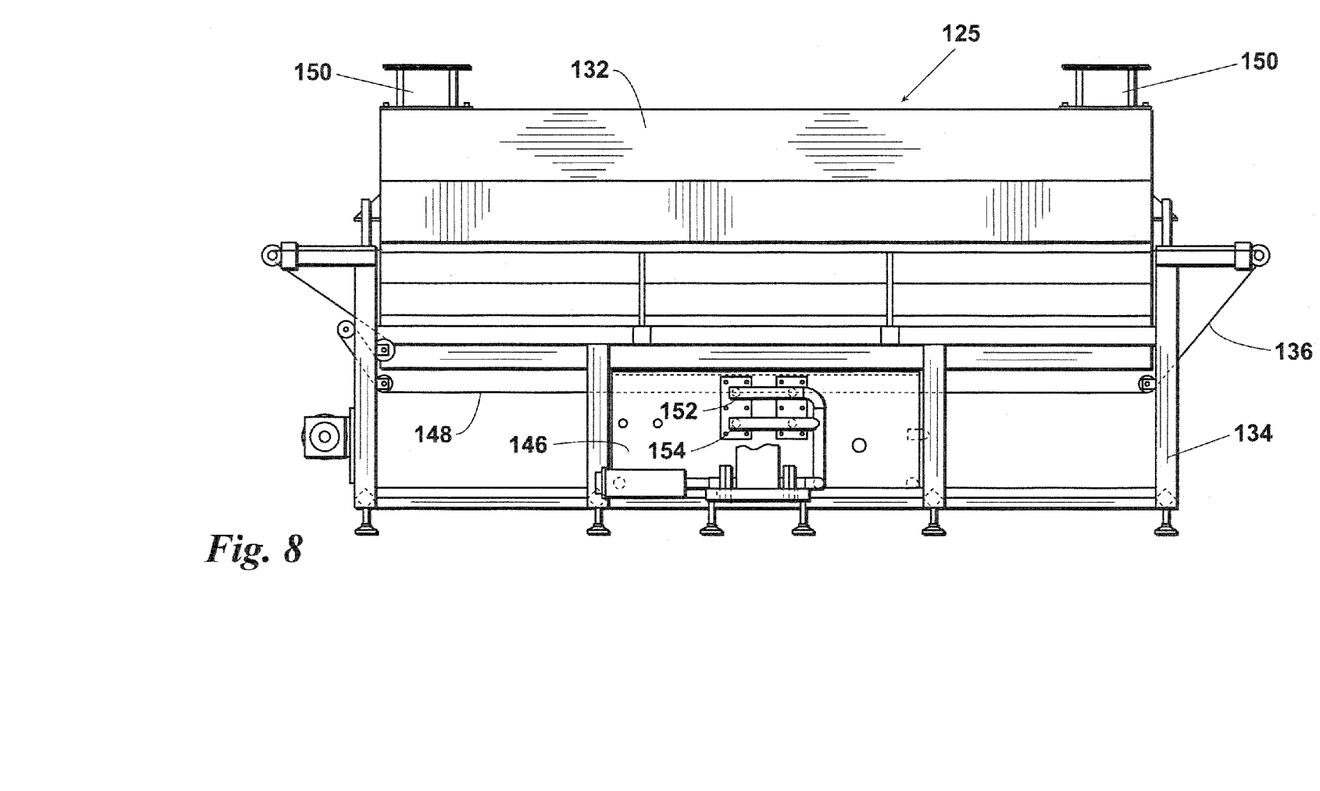
FIG. 8 provides a schematic elevational side view of a continuous infrared oven 125 employed in inventive process 120.
Figure 9:
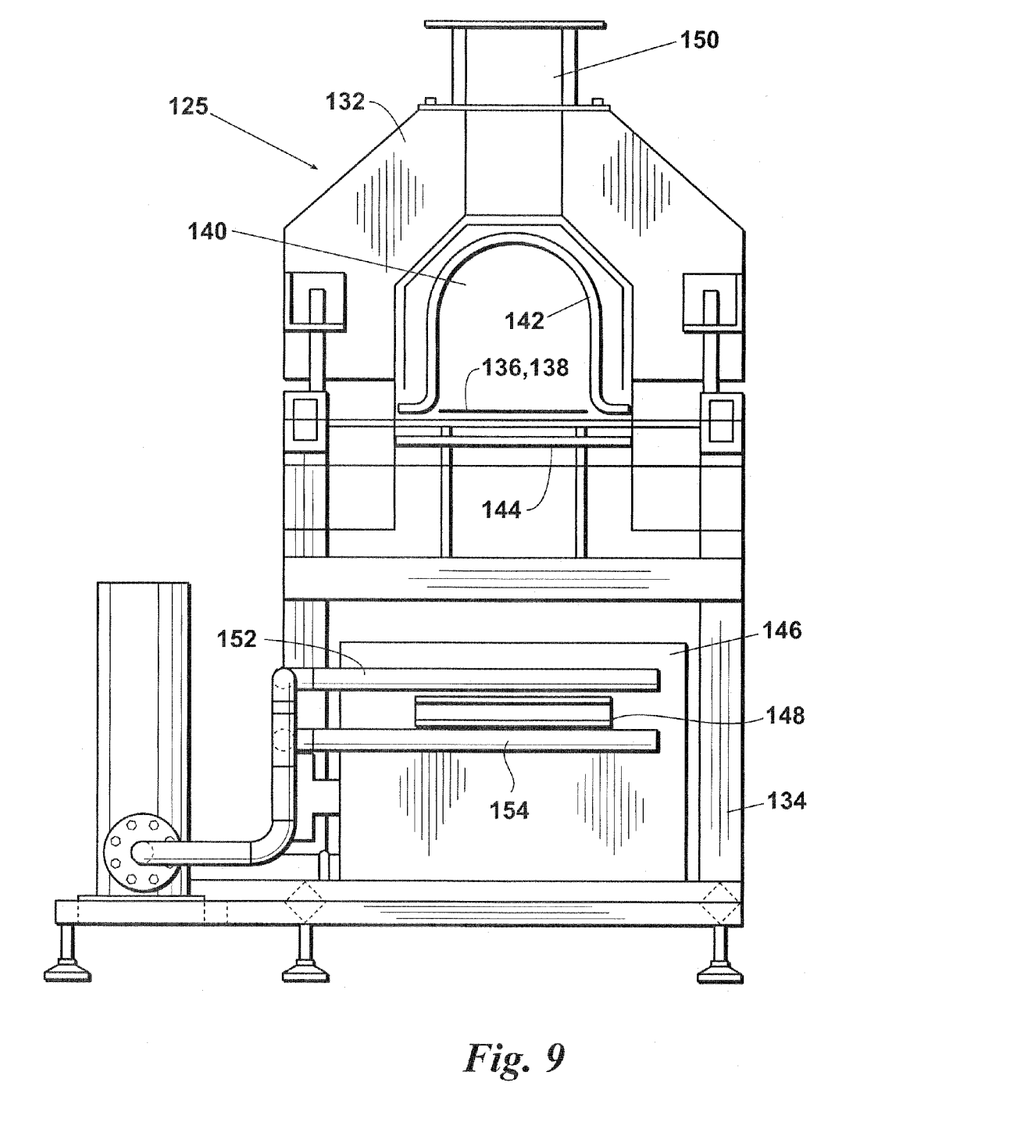
FIG. 9 provides a schematic elevational end view of continuous infrared oven 125.

A continuous infrared oven 125 particularly well suited for use in the inventive process is depicted in FIGS. 8 and 9. The oven is an electric infrared oven comprising: an elongate insulated housing 132 supported on a frame 134; a conveyor 136 having an upper, carrying run 138 extending longitudinally through housing 132; U-shaped inlet and outlet end openings 140; a series of lateral, U-shaped infrared elements 142 positioned within housing 132 above the carrying run 138 of conveyor 136; a series of lateral, infrared elements 144 positioned within housing 132 beneath the carrying run 138 of conveyor 136; a belt washer assembly 146 positioned beneath housing 132 for cleaning the return run 148 of conveyor 136; and overhead ducts 150 provided in housing 132 above the inlet and outlet openings 140 thereof for venting hot air from the oven so that the air does not otherwise escape into and heat the area surrounding the oven. Belt washer assembly 146 preferably includes lateral conduits 152 and 154 above and below the return run 148 of conveyor 136 for cleaning conveyor 136 with a high pressure water spray sufficient to discharge cinders and other particles from the belt.

Conveyor 136 is preferably a stainless steel wire belt or other type of open belt which will allow the infrared energy from lower elements 144 to directly irradiate the lower surfaces of the products. The inverted, U-shaped upper infrared elements 142 desirably surround and directly irradiate the remaining side and upper surfaces of the products. Additionally, the size and shape of the inverted U-shaped upper infrared elements 142 and of the inlet and outlet openings 140 of the oven allow even large products such as whole turkeys and hams to be conveyed through the oven without difficulty.

In another embodiment of the inventive process, an additional cooling step can be employed in system 120 between packaging machine 130 and the hot water system 4. In this embodiment, the cooled packaged product produced in this added step could also be stored for generally any desired period of time prior to the water heating step 4.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of surface pasteurizing, already cooked food products wherein each of said already cooked food products has an outer surface, an internal core, and an internal core temperature, said method comprising the steps of:
   (a) continuously heating said already cooked food products in a manner effective to take said outer surface to a temperature of at least 155° F.;
   (b) then, after step (a), placing said already cooked food products in packages;
   (c) then, after step (b), continuously heating said packages of said already cooked food products using water in a manner effective to take said outer surface to a temperature of at least 155° F.; and
   (d) then, after step (c), continuously cooling said packages of said already cooked food products,
   wherein, except for any incidental heat loss which occurs in conducting said already cooked food products from step (a) to step (b) and from step (b) to step (c), no intervening cooling procedure is performed between step (a) and step (b) and no intervening cooling procedure is performed between step (b) and step (c),
   wherein, for each of said already cooked food products, step (a) has a beginning, step (d) has an end, and said internal core temperature at said beginning of step (a) is a beginning core temperature, and
   wherein steps (a), (b), (c), and (d) are conducted in a manner effective to prevent said internal core temperature from rising to more than 10° F. above said beginning core temperature at any time from said beginning of step (a) to said end of step (d).

2. The method of claim 1 wherein steps (a), (b), (c), and (d) are conducted in a manner effective to prevent said internal core temperature from rising to more than 5° F. above said beginning core temperature at any time from said beginning of step (a) to said end of step (d).

3. The method of claim 1 wherein said outer surface is taken to a temperature of at least 160° F. in step (a) and said outer surface is taken to a temperature of at least 160° F. in step (c).

4. The method of claim 1 wherein said already cooked food products are packaged in step (b) in not more than one minute after completing step (a) and said packages of said already cooked food products begin step (d) in not more than two minutes after completing step (c).

5. The method of claim 1 wherein said packages of said already cooked food products are cooled in step (d) using brine, water, or circulating air.

6. The method of claim 1 wherein said already cooked food products are slicing logs, deli turkey breasts, or deli hams.

7. The method of claim 1 wherein steps (a), (b), (c), and (d) are conducted in a manner effective such that no substantial increase in said internal core temperature above said beginning core temperature occurs at any time from said beginning of step (a) to said end of step (d).

8. The method of claim 1 wherein said packages of said already cooked food products are cooled in step (d) using brine.

9. The method of claim 1 wherein said packages of said already cooked food products are cooled in step (d) using circulating air.

10. The method of claim 1 wherein said water has a temperature of at least 185° F.

11. The method of claim 1 wherein said already cooked food products are continuously heated in step (a) by continuously conducting said already cooked food products through an interior of a heating apparatus, said interior having an inlet opening and an outlet opening, and said inlet and said outlet openings each being open to exterior pressure conditions outside of said heating apparatus.

12. The method of claim 11 wherein said already cooked food products are conducted through said heating apparatus in step (a) by a conveyor which continuously conveys said already cooked food products into said inlet opening, through said interior of said heating apparatus, and out of said outlet opening.

* * * * *

UNITED STATES PATENT AND TRADEMARK OFFICE
CERTIFICATE OF CORRECTION

PATENT NO.       : 7,285,299 B1
APPLICATION NO.  : 10/369318
DATED            : October 23, 2007
INVENTOR(S)      : Howard Page 1 of 1

It is certified that error appears in the above-identified patent and that said Letters Patent is hereby corrected as shown below:

COL. 10

LINE 32 – The comma after the word "pasteurizing" is removed.

Signed and Sealed this

Eighteenth Day of December, 2007

JON W. DUDAS
*Director of the United States Patent and Trademark Office*